Patented Mar. 20, 1934

1,951,747

UNITED STATES PATENT OFFICE 1,951,747

PROCESS FOR THE MANUFACTURE OF ESTERS

Leon P. Brezinski, Chicago, Ill., and Per K. Frolich, Cambridge, Mass.; said Frolich assignor to Standard Oil Development Company, a corporation of Delaware No Drawing. Application April 12, 1929, Serial No. 354,481

16 Claims. (Cl. 260—106)

The present invention relates to the art of esterification and more specifically to a process for forming esters by the direct action of olefins on organic acids. The invention will be fully understood from the following description.

Olefines and organic carboxylic acid are reacted preferably in the presence of a catalyst in a suitable autoclave which may be of any preferred design adapted to withstand pressures of 1,000 pounds per square inch or higher and resistant to attack by the reacting materials. For this purpose an autoclave with a lining of aluminum is satisfactory although a lining of other non-corrosive alloy steels or other metals may be equally good. A steam jacket is preferably provided around the autoclave for heating purposes, and a stirring means, such as a mechanical stirrer fitted through the top head may be used. Means for charging and withdrawing materials from the reactor are also provided as will be understood.

In the operation of our process, pure olefins may be used such as ethylene, propylene, butylene, amylene or the like, or a mixture of olefins, if it is desired to make a mixture of esters. In the same way, a single pure acid such as acetic acid or butyric acid may be used, or a mixture of different fatty acids, for example acetic and propionic acids or other organic acids either mono or poly-basic may be used. Aromatic acids, such as benzoic and the like, may also be used, as will be understood.

While it is preferable to exclude water, it may be present, and the presence of paraffin and/or aromatic hydrocarbons is permissible. The temperature of the reaction is usually not above 250 or 300° C. depending on the particular olefin, acid and catalyst used, and pressure is in considerable excess of atmospheric pressure, for example 250 pounds per square inch or higher is preferable.

The preferred catalysts are salts of acids stronger than the organic acid used in the reaction and include salts of heavy metals, such as zinc chloride, ferric chloride, manganese acetate and the like, although potassium sulphate and other salts as well as charcoal may be used. These catalysts are of a neutral or non-acidic nature.

The products of the reaction may be separated in any satisfactory manner, for example, by distillation or use of selective solvents, and materials which have not reacted may be reused to increase yields. The process may be made continuous if desired.

As an example of our process, approximately equimolal quantities of anhydrous acetic acid which contains in addition about 7.4% of acetic anhydrid and dimethyl ethylene or isobutylene are subjected to treatment at a temperature of 150° C. and 800 pounds per square inch for a period of one hour in contact with a catalyst of zinc chloride in an apparatus similar to that described. Analysis shows that approximately 10.6% conversion to butyl acetate is reached.

In similar experiments approximately 12.5% of propyl acetate is formed from propylene and acetic acid. With zinc chloride as the catalyst, temperatures in the neighborhood of 150° C. are satisfactory, but with manganese acetate higher temperatures about 200 to 250° C. are preferable.

The invention is not to be limited by any theory of the mechanism of the reaction nor by any example given merely by way of illustration, but only by the following claims in which it is desired to claim all novelty inherent in the invention.

We claim:

1. A process for the formation of esters, comprising subjecting an organic carboxylic acid to the action of an olefin hydrocarbon at an elevated temperature not exceeding about 300° C. under pressure in considerable excess of atmospheric pressure and in contact with a catalyst which promotes the combination of olefin with said acid.

2. Process according to claim 1, in which the reacting materials are substantially anhydrous.

3. Process according to claim 1, in which temperature is sufficient to produce an autogenous pressure in excess of 250 pounds per square inch.

4. Process according to claim 1, in which a mixture of hydrocarbons rich in olefins is used.

5. Process according to claim 1, in which the catalyst is a salt of an acid stronger than the acid used in the reaction.

6. Process according to claim 1, in which the time of contact is about one hour.

7. Process according to claim 1, in which the catalyst is a zinc salt of an acid stronger than the acid used in the reaction.

8. Process for producing esters, comprising reacting a low boiling olefin with a substantially anhydrous fatty acid under autogenous pressure of not less than 250 pounds per square inch, in the presence of a catalyst which promotes the combination of olefin with said acid.

9. Process for the preparation of esters which comprises acting upon a fatty acid with an olefine hydrocarbon at a temperature in excess of 100° C. but below about 300° C. and under pressure of 500 pounds per square inch or above in the presence of a catalytic, metal salt of an acid stronger than the acid used in the reaction.

10. Process according to claim 9 in which zinc chloride is used as a catalyst.

11. A process for producing esters, comprising reacting a material containing at least one organic carboxylic acid with a material rich in olefins at a pressure substantially above atmospheric.

12. Process according to claim 11, carried out in the presence of a catalyst which promotes the combination of the olefins with the acid or acids used.

13. Process according to claim 11, carried out at elevated temperature not exceeding about 300° C.

14. Process according to claim 11, carried out by charging the reacting materials into an autoclave and heating until an autogenous pressure in excess of 500 pounds per square inch is produced.

15. Process according to claim 11, carried out by charging the reacting materials into a reaction zone, raising the pressure and heating to a reaction temperature.

16. Process according to claim 11, in which the organic acid used is a fatty acid.

LEON P. BREZINSKI.
PER K. FROLICH.